J. Fieldhouse.
Making Metal Gas-Tubes.
N° 54,643. Patented May 8, 1866.
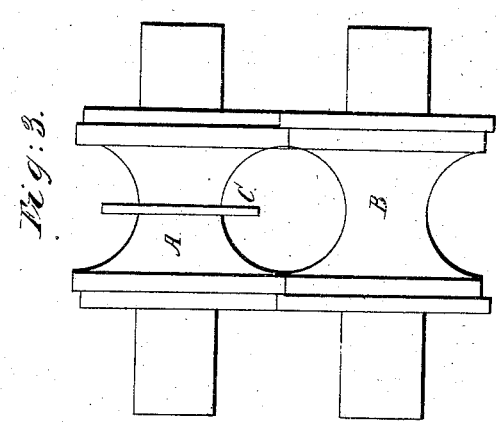
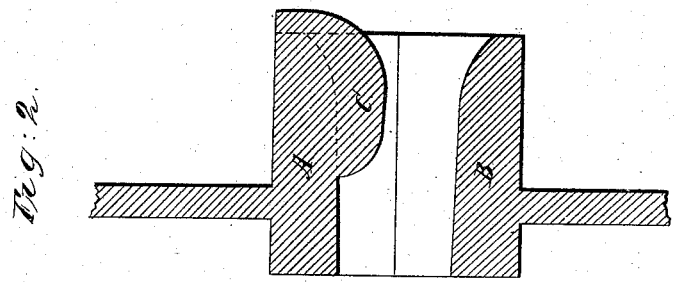
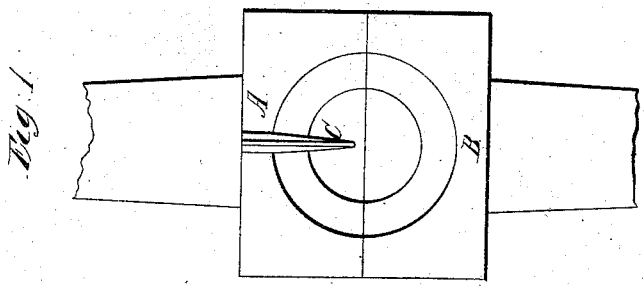
Witnesses:
Samuel N. Piper.
H. Curtis.
Inventor
J. Fieldhouse.
by his Attorney
R. H. Eddy

UNITED STATES PATENT OFFICE.

JOSEPH FIELDHOUSE, OF DIGHTON, ASSIGNOR TO THE DIGHTON FURNACE COMPANY, OF TAUNTON, MASSACHUSETTS.

IMPROVEMENT IN DIES FOR FORMING GAS-PIPES.

Specification forming part of Letters Patent No. 54,643, dated May 8, 1866.

*To all whom it may concern:*

Be it known that I, JOSEPH FIELDHOUSE, of Dighton, in the county of Bristol and State of Massachusetts, have invented a new and useful Improvement in Dies for Converting Sheet-Iron into a Tubular Form, or, in other words, for Making Wrought-Iron Pipes; and I do hereby declare the same to be fully described in the following specification and represented in the accompanying drawings, of which—

Figure 1 is a front or mouth view, and Fig. 2 a longitudinal section, of a pipe forming and welding die as provided with my improvement, which consists in the combination of such a die and an edge-former and guide arranged on and so as to project from it, substantially in manner as hereinafter described.

In the said drawings, A is the upper, and B the lower, half of a die, such as is generally employed for bending a narrow sheet of iron into the form of a pipe and welding together its two opposite edges. In the flaring or trumpet mouth of such die I arrange a sharp lip or guide, C, such guide being formed as represented and made to project into the interior space of the die from its upper surface.

While a plate of iron heated to a welding heat may be in the act of being received by the die and of passing through it, the edges of such sheet will not only be squared or properly shaped, but they will be duly guided into the die by the said edge-guide C.

The plates of iron of which gas-tubing is ordinarily made generally have their edges more or less round, rather than square, to their faces. In consequence of this it is often difficult to make a perfect union of them in the process of welding them together by a die.

With my improvement the edges are not only squared to the faces of the plate, but they are guided into the die and toward each other, so that neither shall override the other, as frequently occurs under the ordinary system of operating by the die alone.

In using my invention the pipe is to be drawn through the die by the means usually adopted for such purpose.

Instead of the two parts A B, rolls may be used, the edge-guide being made to project from one of them in manner as shown in Fig. 3, in which A is the upper, and B the lower, roll, and C the edge-guide, the guide in this case circumscribing the roll or is concentric with its shaft.

What I claim as my invention is—

The combination and arrangement of the edge-guide C with the pipe forming and welding die or its equivalent, substantially as set forth.

JOSEPH FIELDHOUSE.

Witnesses:
R. H. EDDY,
F. P. HALE, Jr.